(12) United States Patent
Calderon

(10) Patent No.: US 8,789,755 B2
(45) Date of Patent: Jul. 29, 2014

(54) CONNECTOR PLACEMENT AND ROUTING FOR OPTICAL BARCODE SCANNER

(75) Inventor: Ferdinand U. Calderon, Cebu (PH)

(73) Assignee: NCR Corporation, Duluth, GA (US)

( * ) Notice: Subject to any disclaimer, the term of this patent is extended or adjusted under 35 U.S.C. 154(b) by 1561 days.

(21) Appl. No.: 12/077,156

(22) Filed: Mar. 17, 2008

(65) Prior Publication Data

US 2009/0230194 A1   Sep. 17, 2009

(51) Int. Cl.
*G06K 7/10* (2006.01)

(52) U.S. Cl.
USPC ............. 235/462.01; 235/462.43; 235/462.44

(58) Field of Classification Search
CPC . G06K 17/0022; G06F 1/1616; G06F 1/1684; G06F 1/1686; G06F 1/1698; G06F 2200/1631; G06F 2200/1639
USPC .......... 235/383, 454, 462.01, 462.14, 462.43, 235/462.44; 186/52, 59, 61; 439/488, 439/620.21, 620.23, 620.25, 821, 823, 844; 340/656, 687; 361/785
See application file for complete search history.

(56) References Cited

U.S. PATENT DOCUMENTS

| | | | |
|---|---|---|---|
| 4,968,883 A * | 11/1990 | Leyshon et al. ................ | 250/239 |
| 4,971,176 A * | 11/1990 | Nojiri et al. ...................... | 186/61 |
| 4,971,177 A * | 11/1990 | Nojiri et al. ...................... | 186/61 |
| 6,161,758 A | 12/2000 | Collins, Jr. et al. | |
| D458,600 S * | 6/2002 | Freitag et al. ................. | D14/314 |
| 6,481,626 B1 | 11/2002 | Nahar | |
| 6,507,352 B1 * | 1/2003 | Cohen et al. ................... | 715/817 |
| 6,631,845 B2 * | 10/2003 | Barkan ........................ | 235/462.4 |
| 6,854,647 B2 * | 2/2005 | Collins et al. .................. | 235/383 |
| 7,032,824 B2 * | 4/2006 | Miyazawa et al. ....... | 235/462.43 |
| 7,679,901 B2 * | 3/2010 | Lin ........................... | 361/679.43 |
| 8,085,245 B2 * | 12/2011 | Hsu et al. ....................... | 345/169 |
| 2002/0021551 A1 * | 2/2002 | Kashiwagi .................... | 361/683 |
| 2004/0164955 A1 * | 8/2004 | Miyashita et al. ............. | 345/156 |
| 2009/0046074 A1 * | 2/2009 | Shneidman .................... | 345/173 |

FOREIGN PATENT DOCUMENTS

JP          2005223748 A   *   8/2005

* cited by examiner

*Primary Examiner* — Thien M Le
*Assistant Examiner* — April Taylor
(74) *Attorney, Agent, or Firm* — Harden E. Stevens, III

(57) ABSTRACT

A bar code scanner is configured for placement in a retail checkout counter. The barcode scanner includes a box-shaped scanner housing to be received by the checkout counter. The box-shaped scanner housing includes a front portion and a rear portion with a recess formed in the rear portion. The recess includes two opposing walls oriented substantially perpendicular to the scanner window plane. A first socket is positioned in a first of the two opposing walls of the recess. A second socket is positioned in a second of the two opposing walls of the recess. The first socket is oriented to receive a first connector in a direction that is different from a direction perpendicular to the window plane. The second socket is oriented to receive a second connector in a direction that is opposite the first direction.

19 Claims, 11 Drawing Sheets

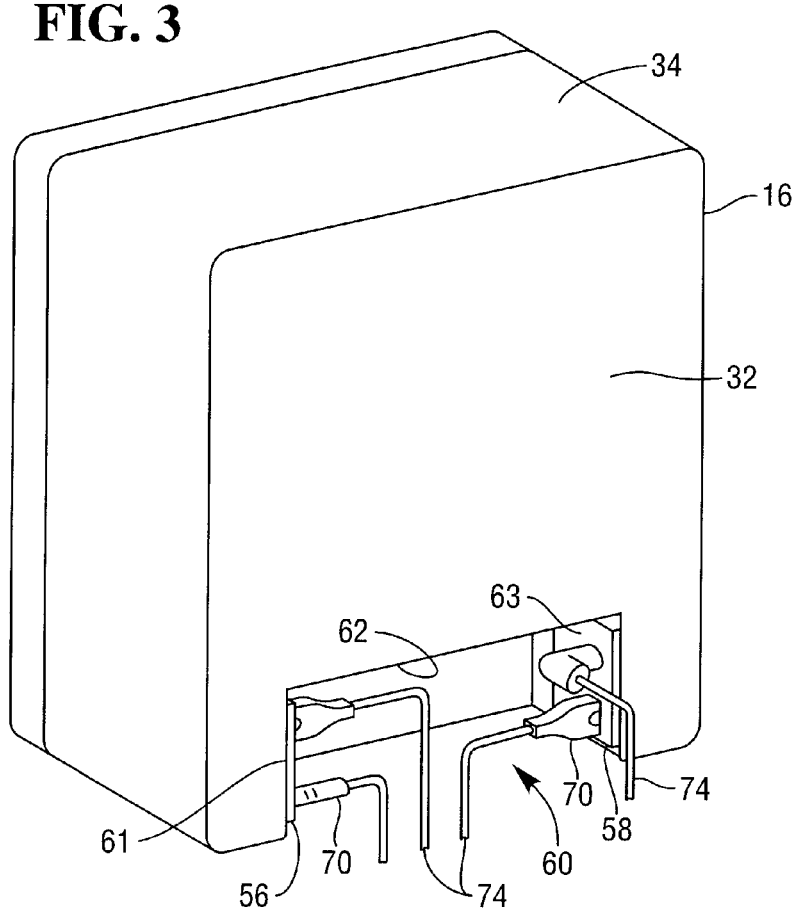
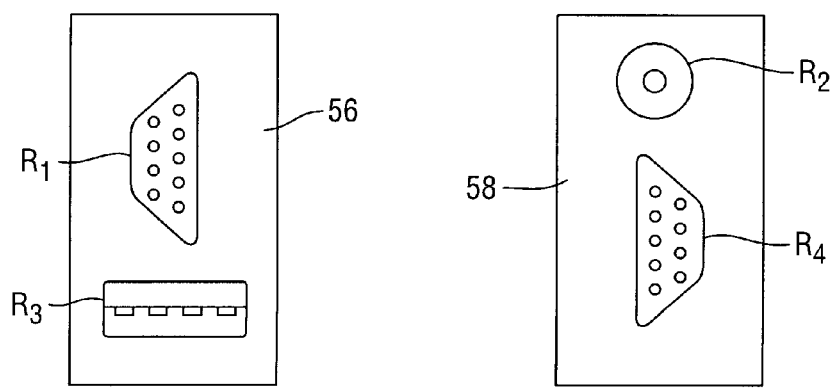

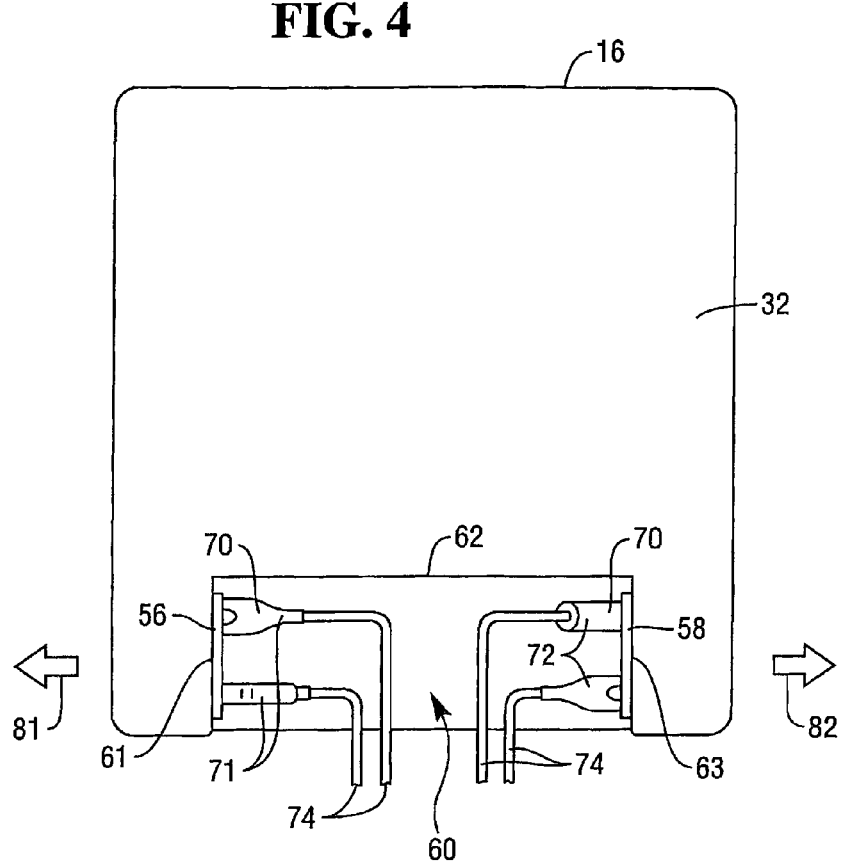

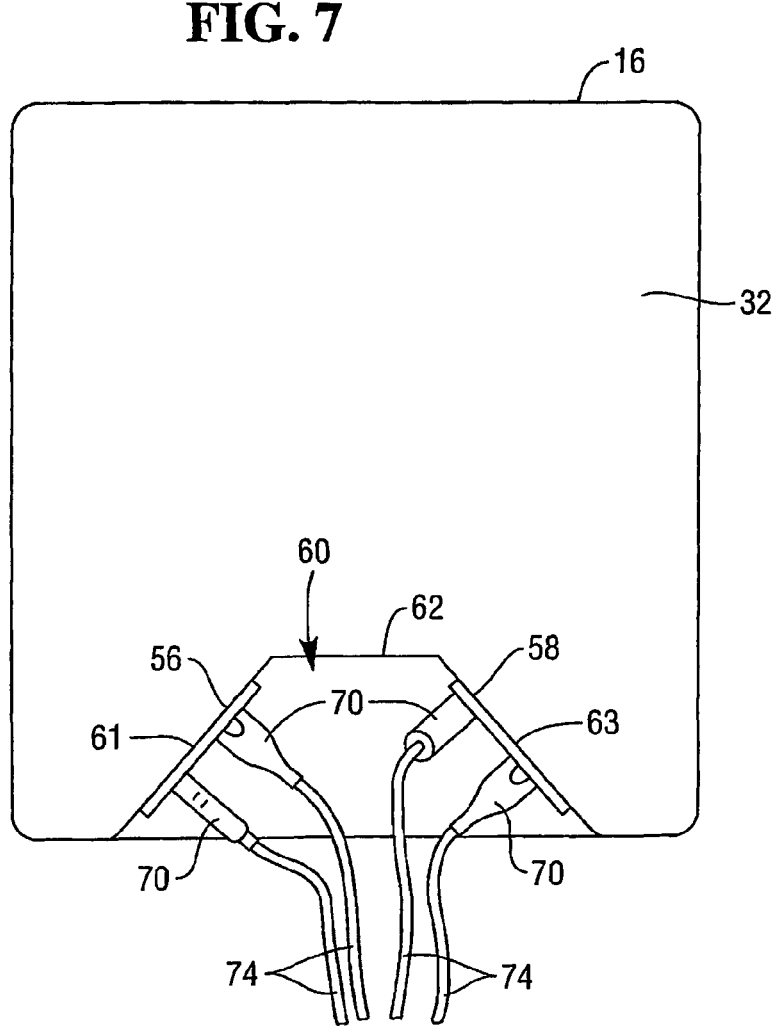

CONNECTOR PLACEMENT AND ROUTING FOR OPTICAL BARCODE SCANNER

FIELD

This application relates to the field of optical barcode scanners, and more particularly to connector arrangements for optical barcode scanners.

BACKGROUND

Bar code scanners are well known for their usefulness in retail checkout and inventory control. Bar code scanners typically comprise a number of elements provided in a single housing. For example, the housing typically contains a processor, a laser light source, various other optical elements for projecting a scanning beam outwardly from the scanner, and a decoder for receiving light reflected from a barcode on a merchandise item. A window is also positioned in the scanner housing for passing the scanning beam from the housing to the merchandise item. Light reflected from the barcode on the merchandise item is returned through the window for decoding by the decoder.

In typical operation, the bar code scanner housing is mounted in a cavity provided in a retail checkout counter. The housing may be arranged in the counter with the window positioned in either a horizontal plane or a vertical plane. In either case, power and data connections to and from the bar code scanner are typically made with the connectors to the scanner projecting outward from the back of the scanner (i.e., in a direction substantially perpendicular to the plane of the window). However, when the scanner is placed in the checkout counter, there is often limited space available behind the scanner. Accordingly, the rearwardly projecting connectors may make it difficult to properly mount the scanner in the checkout counter. In view of the foregoing, it would be desirable to provide a bar code scanner having a connector arrangement that conserves space at the back of the scanner.

SUMMARY

A bar code scanner is disclosed herein configured for placement in a retail checkout counter. The barcode scanner includes a box-shaped scanner housing to be received by the checkout counter. The box-shaped scanner housing includes a front portion and a rear portion with a chamber positioned between the front portion and the rear portion.

Scanner circuitry is positioned in the chamber formed by the scanner housing. The scanner circuitry comprises laser circuitry, detector circuitry and processor circuitry. A scan window is formed in the front portion of the box-shaped scanner housing. A window pane is placed in the scanner window. The scan window defines a scan window plane.

A recess is formed in the rear portion of the scanner housing. The recess includes two opposing walls oriented substantially perpendicular to the scanner window plane. A first socket is positioned in a first of the two opposing walls of the recess. A second socket is positioned in a second of the two opposing walls of the recess. The first socket is oriented to receive a first connector in a direction that is substantially parallel to the scan window plane. The second socket is oriented to receive a second connector in a direction that is directly opposite the first direction. With the cables and connectors directed to sockets on opposing walls of the recess, a "T" like arrangement is formed by the connectors and cables leading to the scanner.

The above described features and advantages, as well as others, will become more readily apparent to those of ordinary skill in the art by reference to the following detailed description and accompanying drawings. Furthermore, while it would be desirable to provide a bar code scanner that provides one or more of these or other advantageous features as may be apparent to those reviewing this disclosure, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 3 shows a rear perspective view of the barcode scanner of FIG. 1;

FIG. 4 shows a rear plan view of the barcode scanner of FIG. 1;

FIG. 5 shows a plan view of a first socket board of the barcode scanner of FIG. 1;

FIG. 6 shows a plan view of a second socket board of the barcode scanner of FIG. 1;

FIG. 7 shows an rear plan view of an alternative embodiment of the barcode scanner of FIG. 4;

DESCRIPTION

Figure 1:
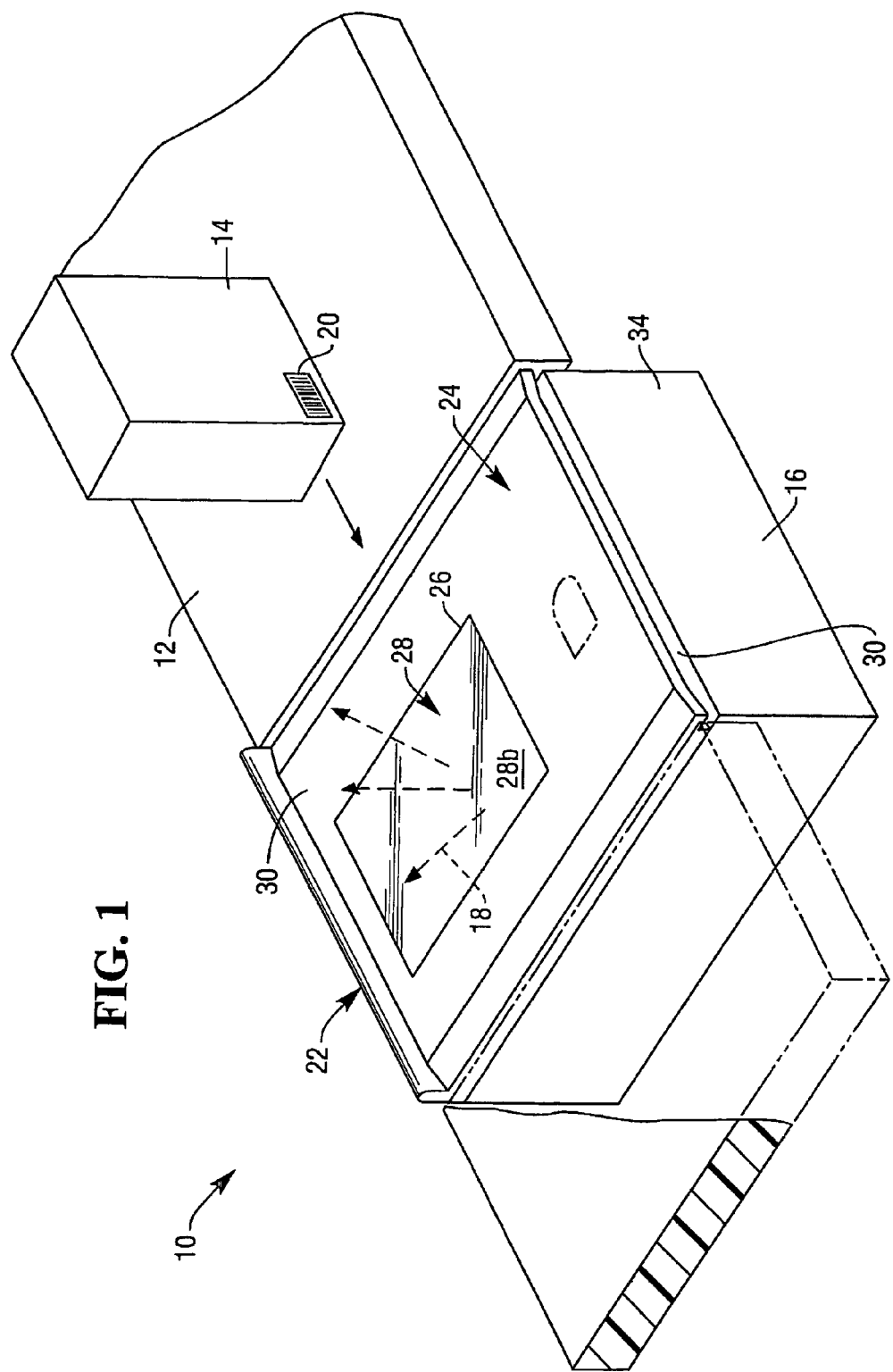
FIG. 1 shows a barcode scanner positioned in a retail checkout counter.

With reference to FIG. 1, an optical barcode scanner 10 is mounted flush in a checkout counter 12. Merchandise 14, such as grocery items, clothing, hardware, or other goods having a bar code affixed thereto may be dragged over the scanner 10. The scanner 10 includes a housing 16 configured in any conventional manner to include a laser and cooperating optical elements for producing laser scan lines 18 in a suitable pattern for being reflected off a conventional barcode 20 on the item 14 as it is dragged across the scanner. The barcode 20 on the merchandise typically includes a series of alternating dark bars and light spaces of varying width which may be decoded by the scanner in any conventional manner.

The scanner 10 also includes a scan window 22 in accordance with an exemplary embodiment of the present invention through which the scan lines 18 may be transmitted upwardly to engage the barcode 20, with light reflected there-from being reflected back through the window 22 inside the housing 16 through collection optics therein for decoding the barcode 20.

The window 22 includes an aperture 26 formed in the housing, and a window frame 24 formed around the aperture 26. A window pane 28 in the form of a simple flat plate of transparent glass is slightly smaller in size than the aperture and disposed therein. A window plane is defined by the window 22, such as the plane containing the surface of window pane 28.

As can be seen in FIG. 1 and also in FIG. 3, the housing 16 is generally box-shaped and includes a front portion 30 and a back portion 32 with sidewalls 34 extending between the front portion 30 and the back portion 32. An interior chamber is formed within the housing between the front portion 30 and the back portion 32.

Figure 2:
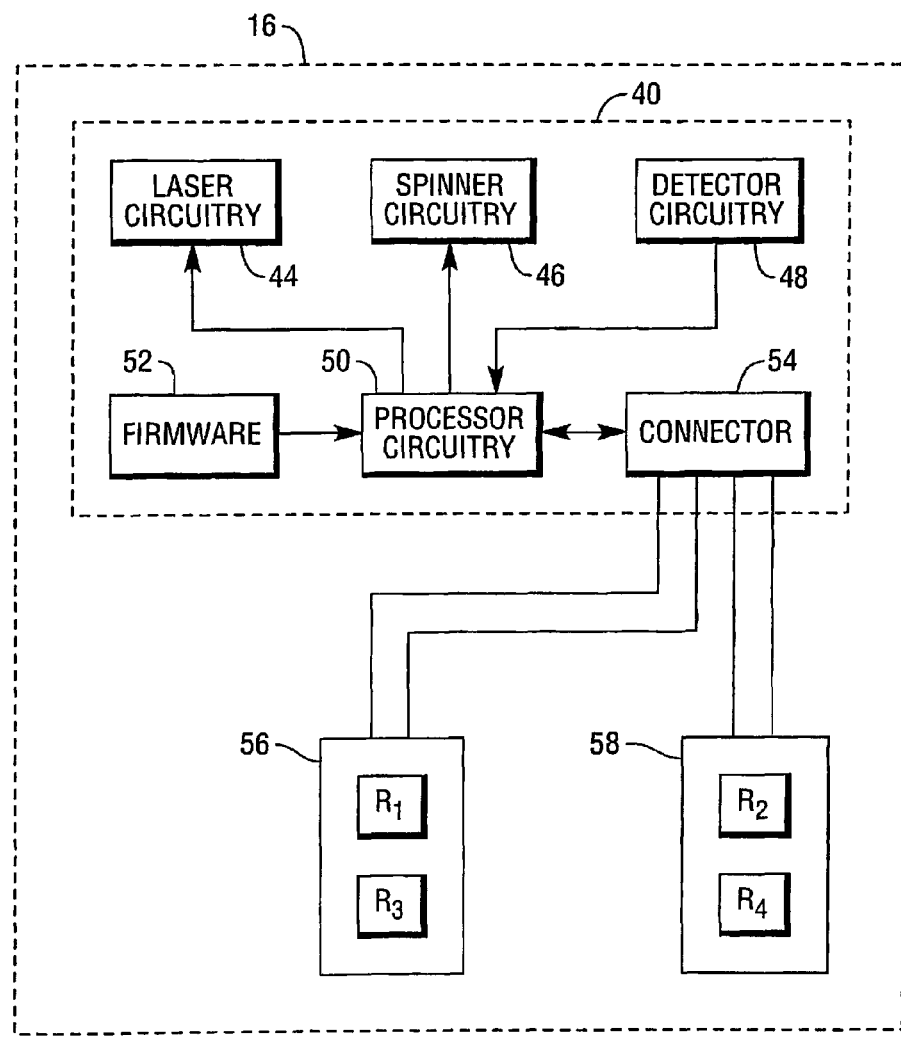
FIG. 2 shows a block diagram of the contents of the barcode scanner of FIG. 1.

With reference now to FIG. 2, the contents of the housing 16 are shown in block diagram form. A printed circuit board (PCB) 40 is provided within the housing 16. Scanner PCB 40 includes typical scanner circuitry and other components, such as laser circuitry 44, spinner circuitry 46, detector circuitry 48, processing circuitry 50, and firmware 52.

Scanner PCB 40 includes connector 54. Connector 54 is coupled to connector structures 56, 58 positioned on the back portion 32 of the scanner. The connector structures 56, 58 each include one or more sockets configured to mate with connectors attached to the end of cables. These cables are configured to send optical and/or electrical signals to and from the scanner 10. For example, the cables and related connectors may be used to provide data communications and/or power connections for the scanner.

In the embodiment of FIG. 2, the connector structures 56, 58 are boards with two sockets positioned on each board. In particular, sockets R1 and R3 are positioned on board 56, and sockets R2 and R4 are positioned on board 58. The connectors may be any of various types of sockets used in the industry, including a power socket, a USB port, an RS232 port, and a main port/RS232/USB/wedge.

Turning now to FIGS. 3 and 4, the rear portion 32 of a scanner housing 16 is shown with a recess 60 formed in the rear portion 32 of the scanner housing. The recess 60 is formed at the side of the housing such with three walls 61, 62, 63 extending upward toward the scan window 22 and cutting into the space that would otherwise form part of the chamber within the housing 16. The three walls 61, 62, and 63 generally define the recess 60 and extend in a direction substantially perpendicular to the scan window 22. Walls 61 and 63 oppose one another in the recess 60, with wall 61 holding connector board 56 and wall 63 holding connector board 58.

Connector board 56 is shown in FIG. 5 with sockets R1 and R3 positioned on the board. In this embodiment, socket R1 is an RS232 port and socket R3 is a USB port. Connector board 58 is shown in FIG. 6 with sockets R2 and R4. In this embodiment, socket R2 is a power port and socket R4 is a RS232 port.

Returning again to FIGS. 3 and 4, it can be seen that, in at least one embodiment, the arrangement of the sockets R1-R4 is such that the connectors 70 and associated cables 74 form a "T" like arrangement when connected to the sockets R1-R4 in the housing. The cables 74 generally form the trunk of the "T," and the directly opposed connectors 70 generally form the opposed branches of the "T". In particular, as best seen in FIG. 4, the connectors 70 include connectors 71 and opposed connectors 72. Connectors 71 mate with sockets R1 and R3 in a first direction (as shown by arrow 81 of FIG. 4). Connectors 72 mate with sockets R2 and R4 in a second direction (as shown by arrow 82 in FIG. 4) that is directly opposite the first direction. Accordingly sockets R1 and R3 are directly opposed to sockets R2 and R4. Likewise, connectors 71 are directly opposed to connectors 72. While the direction of arrows 81 and 82 are directly opposite, they are both parallel to the window plane (e.g., the plane that retains the window pane 28) in the embodiment of FIG. 4. In particular, since FIG. 4 is a rear view of the housing 16, the window pane 28 and associated window plane is parallel with the plane of the paper on which FIG. 4 is printed.

In at least one alternative embodiment shown in FIG. 7, the walls 61 and 63 of the recess and the arrangement of the sockets R1-R4 is such that the connectors 70 and associated cables 74 form a "Y" like arrangement when connected to the sockets R1-R4 in the housing. In this embodiment, the sockets R1-R4 mate with the connectors 70 in substantially opposing directions, but the opposing directions are not directly opposed. As used herein, the term "opposite" directions refers to directions that form an angle of generally greater than 90°. The term "directly opposite" directions refers to opposing directions that are about 180° apart. In the embodiment of FIG. 7, the sockets R1-R4 mate with the connectors 70 in directions that are also substantially parallel to the window plane.

Figure 8:
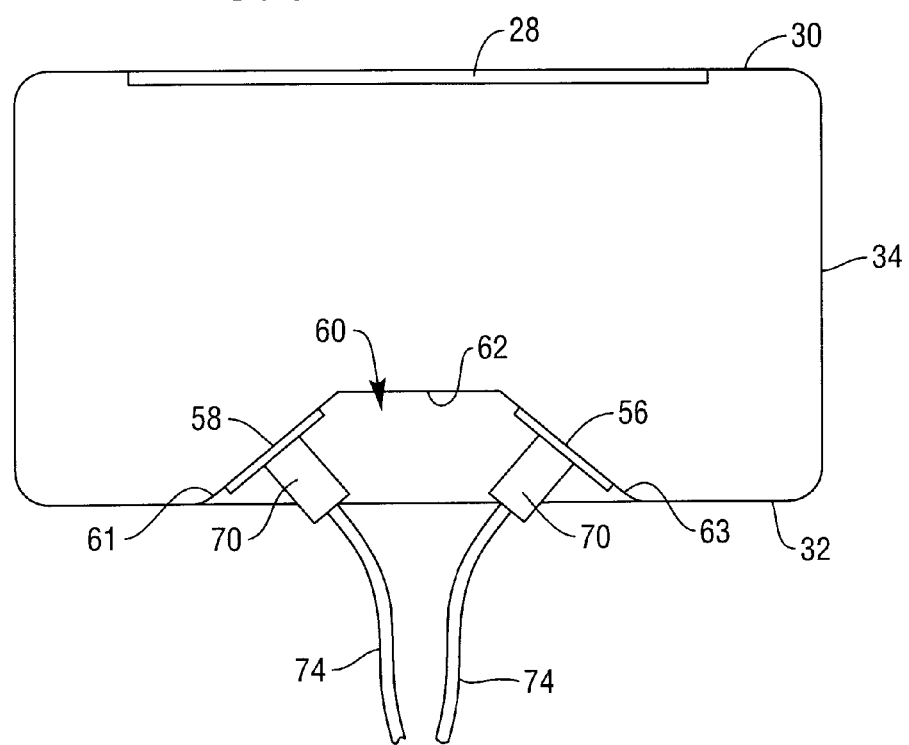
FIG. 8 shows a side plan view of another alternative embodiment of the barcode scanner of FIG. 4.

In another alternative embodiment shown in FIG. 8, the walls 61 and 63 of the recess and the arrangement of the sockets R1-R4 is such that the connectors 70 and associated cables 74 form a "Y" like arrangement when connected to the sockets R1-R4 in the housing. In this embodiment, the sockets R1-R4 mate with the connectors 70 in opposing directions, but the opposing directions are not directly opposed, and are instead opposed at an angle of about 90°. Furthermore, in the embodiment of FIG. 8, the sockets R1-R4 mate with the connectors 70 in directions that are not parallel to the window plane (which is represented in FIG. 8 by the window pane 28 positioned on top of the housing 16) but are offset from the window plane by about 45°. Accordingly, the sockets R1-R4 mate with the connectors 70 in the embodiment of FIG. 8 in a direction that is substantially different from a direction perpendicular to the scan window plane.

Figure 9:
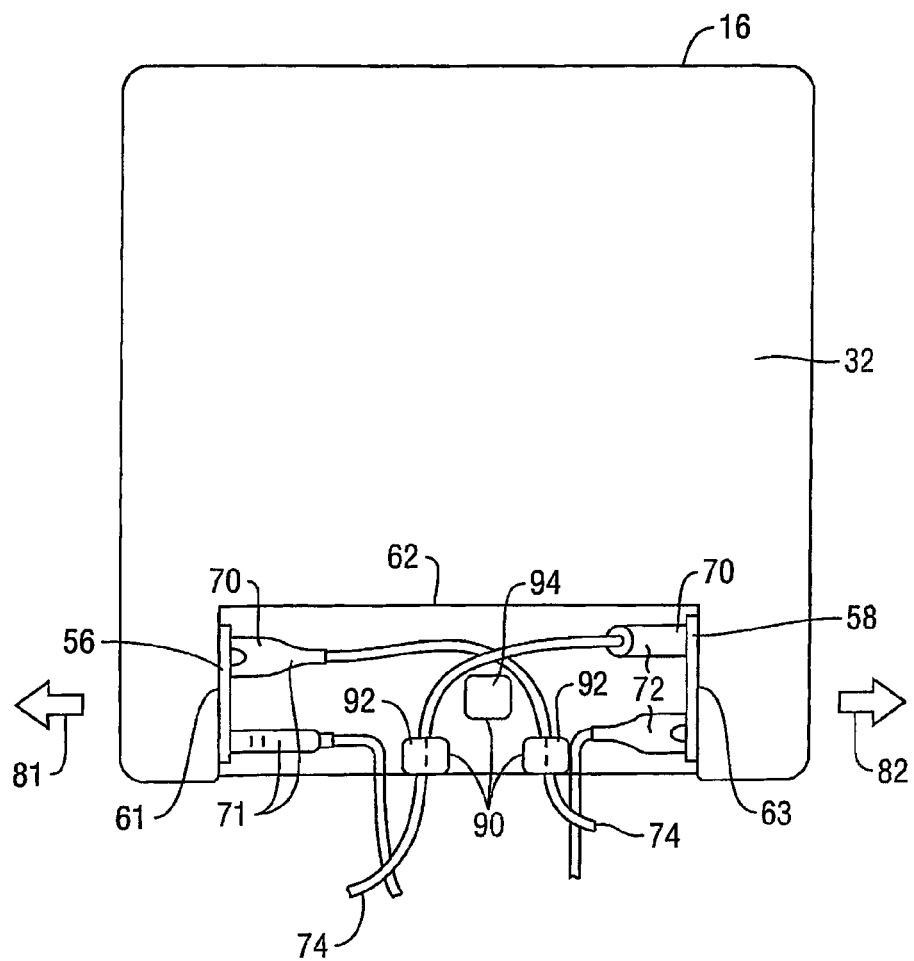
FIG. 9 shows a rear plan view of an alternative embodiment of the barcode scanner of FIG. 1 including a plurality of routing obstacles provided in the housing recess.

Yet another alternative embodiment is shown in FIG. 9. In this embodiment, a plurality of routing members 90 in the form of hooks 92, posts 94, or other obstacles are positioned in the recess 60 in the housing 16. The routing members 90 facilitate a preferred or proper routing arrangement for the cables 74 within the recess 60. The routing members 90 also provide strain relief features for the cables 74 by protecting the cables from mechanical stress. In addition, the routing members 90 hold the cables 74 in place in the event that the cables are accidentally pulled in a direction away from the recess 60. In the disclosed embodiment, the routing members 90 extend outward from the housing 16 in a direction that is perpendicular to the window plane. The hooks 92 are comprised of posts with curved portions 96 at the ends of the posts. The curved portions 96 protrude from the posts in a direction generally parallel to the window plane. These curved portions 96 hook around the cables 74, trapping the cables in place when properly routed within the recess 60.

Figure 10:
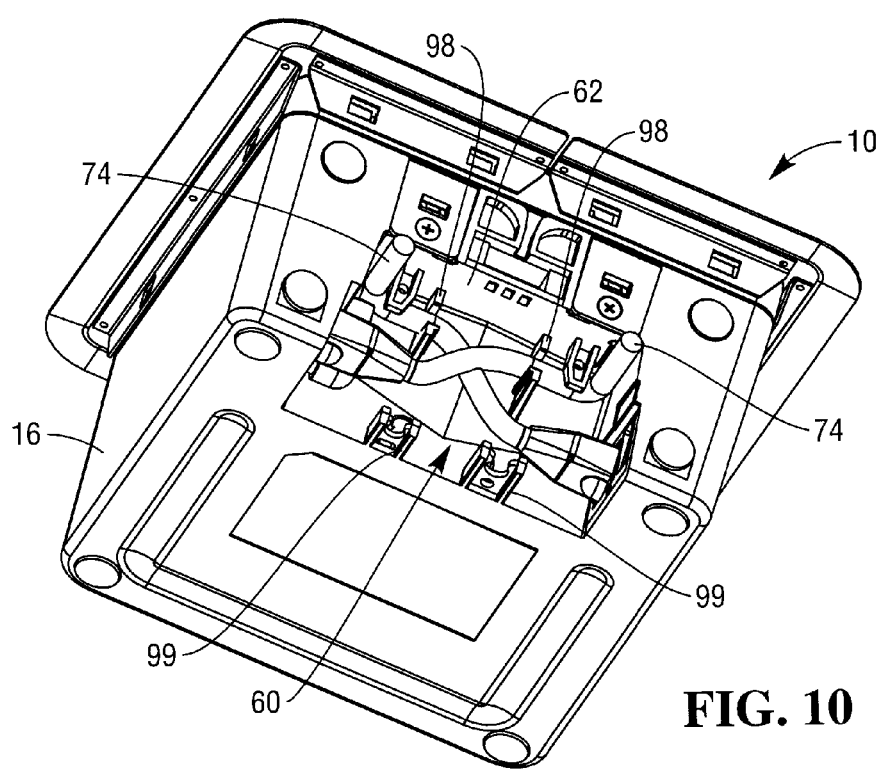
FIG. 10 shows a perspective view of another alternative embodiment of the barcode scanner of FIG. 1 with a plurality of routing obstacles directing the cables out the side of the scanner.
Figure 11:
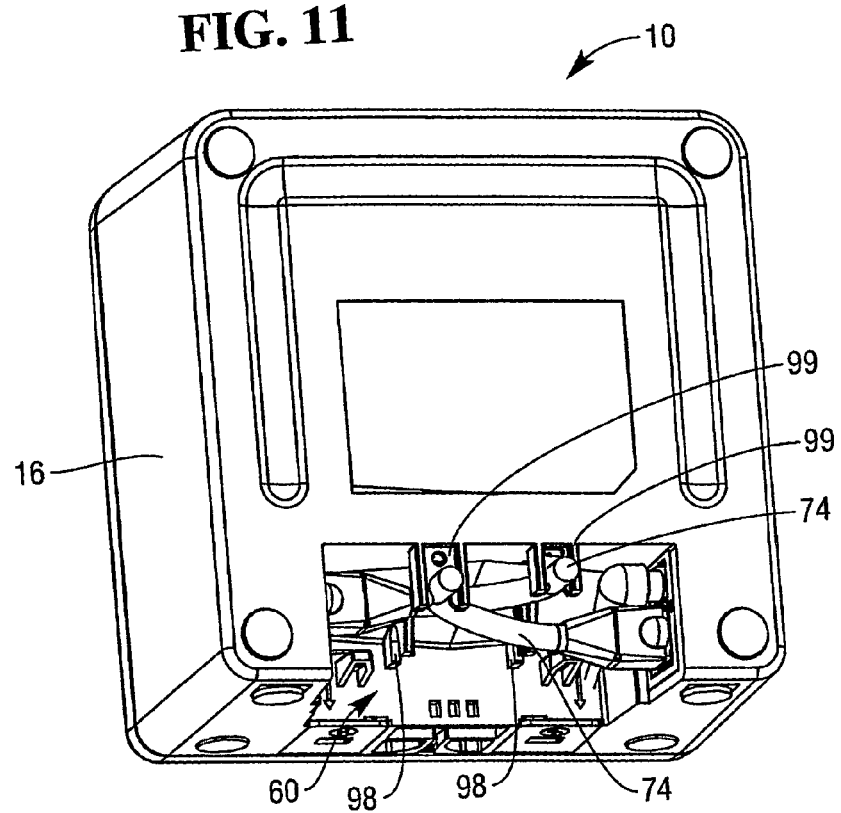
FIG. 11 shows a perspective view of the barcode scanner of FIG. 10 with the plurality of routing obstacles directing the cables out the rear of the scanner.

FIGS. 10 and 11 show yet another alternative embodiment of the barcode scanner 10. The cables 74 leading to the scanner may enter the recess 60 through a side approach, as shown in FIG. 10 (i.e., cables extend from the side of the housing 16 in a direction that is parallel to the window 22), or a rear approach, as shown in FIG. 11 (i.e., the cables extend from the bottom of the housing 16 in a direction that is perpendicular to the window 22). The side approach of FIG. 10 is generally used when the scanner is in a horizontal mode (i.e., the window 22 is horizontal). By contrast, the rear approach of FIG. 11 is generally used when the scanner is in a vertical mode (i.e., the window 22 is vertical). FIGS. 10 and 11 show various routing members 90 included in the recess 60. As can be seen from a comparison of FIGS. 10 and 11, certain routing members may be used when the scanner 10 is in the horizontal mode (e.g., routing members 98) and different routing members may be used when the scanner 10 is in the vertical mode (e.g., routing members 99).

Figure 12:
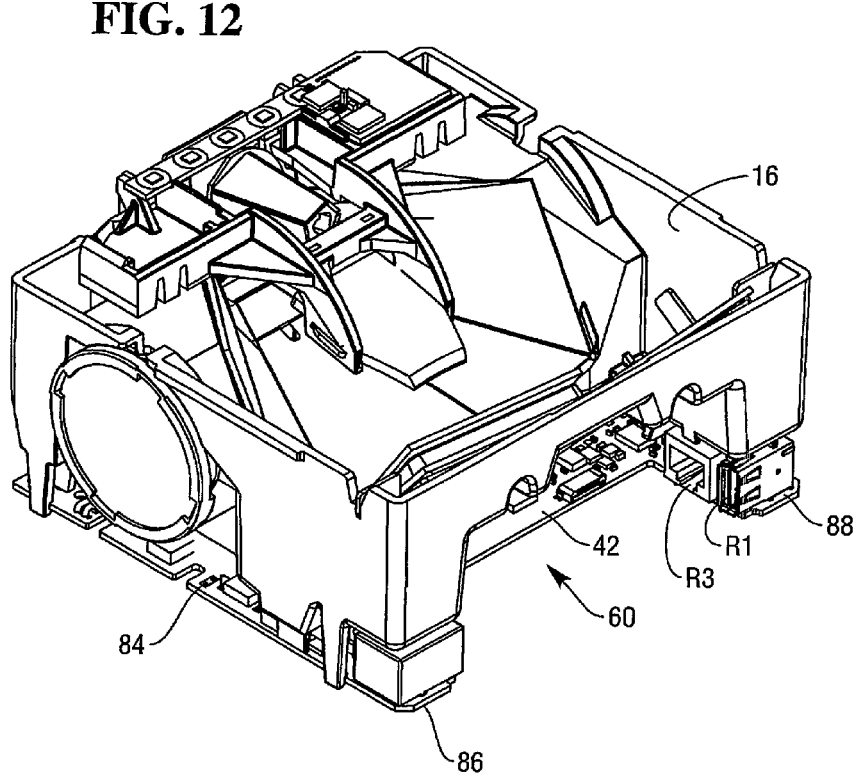
FIG. 12 shows a top perspective yet another alternative embodiment of the barcode scanner of FIG. 1 without the scan window and with the connectors provided on a single circuit board.
Figure 13:
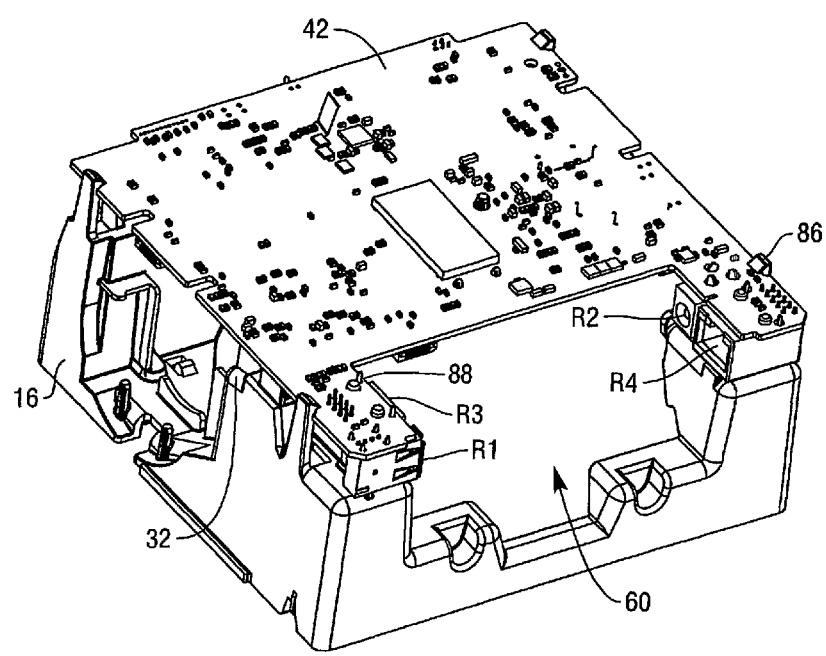
FIG. 13 shows a bottom cutaway perspective view of the barcode scanner of FIG. 12.

FIGS. 12 and 13 show still another alternative embodiment of the barcode scanner 10. In the embodiment of FIGS. 12 and 13, the receptacles R1-R4 are all mounted on a single printed circuit board 42 for the scanner. The printed circuit board 42 is generally provided near the back portion 32 of the housing 16, within the housing 16 but opposite the scan window 22. The printed circuit board 42 includes a rectangular main portion 84 with two arms 86, 88 extending out from the main portion 84. Receptacles R1 and R3 are held on arm 88 and receptacles R2 and R4 are held on arm 86. With this arrangement, even though the receptacles R1 and R3 are opposed to the receptacles R2 and R4 in the recess 60, the receptacles R1-R4 are advantageously all held on the single printed circuit board 42. The receptacles R1-R4 are electrically connected to other electrical components on the printed circuit board 42. In this embodiment of FIGS. 12 and 13, the connectors attached to exterior wires leading to the scanner engage the receptacles R1-R4 in a direction that is parallel to the printed circuit board 42. The receptacles R1-R4 extend above the printed circuit board 42 and open to the recess 60 to facilitate the mounting of the receptacles to the single printed circuit board. The arrangement of the printed circuit board 42 with two arms 86 and 88 extending from the main body 84 allows the receptacles R1-R4 to be arranged on the printed circuit board 42 in opposing fashion.

Although the present invention has been described with respect to certain preferred embodiments, it will be appreciated by those of skill in the art that other implementations and adaptations are possible. For example, it will be recognized that different connector types, a differently shaped housing, a different opposing wall configuration and/or a differently shaped recess in the back of the housing may be provided in alternative embodiments of the bar code scanner. Moreover, there are advantages to individual advancements described herein that may be obtained without incorporating other aspects described above. Therefore, the spirit and scope of the appended claims should not be limited to the description of the preferred embodiments contained herein.

What is claimed is:

1. A barcode scanner configured for connection to a cable attached to a connector, the barcode scanner comprising:
   a housing including a front portion and a rear portion and sides of the housing extending between the front portion and the rear portion;
   a scan window provided in the front portion of the housing, the scan window positioned within a scan window plane;
   a recess formed in the rear portion of the housing and at a side of the housing wherein the recess includes a first and second opposing wall, the first opposing wall positioned within a first opposing wall plane that is perpendicular to the scan window plane and the second opposing wall positioned within a second opposing wall plane that is perpendicular to the scan window plane; and
   a first socket positioned on the first opposing wall wherein the first socket is oriented toward the second opposing wall to receive a first connector in a first direction that is perpendicular to the first opposing wall.

2. The barcode scanner of claim 1 wherein the first opposing wall plane is parallel to the second opposing wall plane.

3. The barcode scanner of claim 1 wherein the recess further includes a third wall perpendicular to the scan window and joining the first and second opposing walls.

4. The barcode scanner of claim 3 wherein the first and second opposing walls are angled with respect to the third wall at an angle greater than 90°.

5. The barcode scanner of claim 1 further comprising a second socket positioned on the second opposing wall.

6. The barcode scanner of claim 5 wherein the first socket is oriented to receive the first connector in the first direction and the second socket is oriented to receive a second connector in a second direction, wherein the first direction is directly opposite the second direction.

7. The barcode scanner of claim 5 further comprising a third socket positioned on the first opposing wall and a fourth socket positioned on the second opposing wall.

8. The barcode scanner of claim 7 wherein each of the sockets are selected from the group consisting of a power socket, a USB port, an RS232 port, and a main port/RS232/USB/wedge.

9. The barcode scanner of claim 1 wherein the recess includes at least three walls which are substantially perpendicular to the scan window plane.

10. A barcode scanner comprising:
    a checkout counter;
    a box-shaped scanner housing positioned in the checkout counter, the box-shaped scanner housing including a front portion and a rear portion and sides of the housing extending between the front portion and the rear portion, with a chamber positioned between the front portion and the rear portion;
    scanner circuitry positioned in the chamber of the scanner housing, the scanner circuitry comprising laser circuitry, detector circuitry and processor circuitry;
    a scanner window formed in the front portion of the box-shaped scanner housing, the scanner window defining a scanner window plane;
    a recess formed in the rear portion and at a side of the box-shaped scanner housing, the recess including a first wall oriented substantially perpendicular to the scanner window plane; and
    a first socket positioned in the first wall of the recess, the first socket oriented to receive a first connector attached to a cable in a first direction that is substantially parallel to the scanner window plane.

11. The barcode scanner of claim 10 further comprising a second wall opposite the first wall and oriented substantially perpendicular to the scanner window plane.

12. The barcode scanner of claim 11 further comprising a second socket on the second wall where the first socket is oriented to receive the first connector in the first direction and the second socket is oriented to receive a second connector in a second direction, the first direction being opposite the second direction.

13. The barcode scanner of claim 10 further comprising a window pane positioned in the scanner window.

14. A barcode scanner comprising:
    a housing with a scan window provided in the housing;
    a printed circuit board;
    a first socket positioned on the housing, the first socket oriented to receive a first connector in a first direction; and
    a second socket positioned on the housing opposing the first socket, the second socket oriented to receive a second connector in a second direction, wherein the first direction is opposite the second direction, wherein the first socket and the second socket are mounted on the printed circuit board.

15. The barcode scanner of claim 14 wherein a window pane is positioned on the housing in the scan window.

16. The barcode scanner of claim 14 further comprising a recess provided on a back and side portion of the housing, wherein the first socket and second socket are positioned in the recess.

17. The barcode scanner of claim 16 wherein the recess comprises two opposing walls, wherein the first socket is positioned on a first of the two opposing walls and the second socket is positioned on a second of the two opposing walls.

18. The barcode scanner of claim 14 wherein the first direction and the second direction are substantially parallel to a plane defined by the scan window.

19. The barcode scanner of claim 14 wherein the printed circuit board has a rectangular main portion with first and second arms extending out from the rectangular main portion, and the first socket and second socket are mounted on the first and second arms of the printed circuit board, respectively.

* * * * *